US008870171B2

(12) United States Patent
Herbold et al.

(10) Patent No.: US 8,870,171 B2
(45) Date of Patent: Oct. 28, 2014

(54) SHROUD RETAINING PIN EXTRACTION SYSTEMS AND METHODS

(75) Inventors: John Herbold, Greenville, SC (US); Paul Kalmar, Greenville, SC (US); Randall Corn, Greenville, SC (US); James Holmes, Greenville, SC (US)

(73) Assignee: General Electric Company, Schenectady, NY (US)

( * ) Notice: Subject to any disclaimer, the term of this patent is extended or adjusted under 35 U.S.C. 154(b) by 910 days.

(21) Appl. No.: 13/026,330

(22) Filed: Feb. 14, 2011

(65) Prior Publication Data

US 2012/0204398 A1 Aug. 16, 2012

(51) Int. Cl.
*B25B 1/20* (2006.01)
*B23B 41/00* (2006.01)
*B23B 47/28* (2006.01)
*B23B 49/02* (2006.01)
*B25B 27/18* (2006.01)
*F01D 25/28* (2006.01)
*F01D 25/24* (2006.01)

(52) U.S. Cl.
CPC ............. *B25B 27/18* (2013.01); *F05D 2260/31* (2013.01); *F01D 25/285* (2013.01); *F01D 25/246* (2013.01); *B23B 47/284* (2013.01); *F05D 2230/70* (2013.01)
USPC ...... 269/87.3; 408/80; 408/115 R; 408/115 B

(58) Field of Classification Search
CPC ........ B25B 27/18; B25B 27/02; B25B 47/28; B25B 2260/042; B25B 41/00; B25B 47/284; B25B 51/08; B25H 1/0078
USPC ......... 173/32; 29/255; 408/80, 115 B, 115 R; 269/87.3
See application file for complete search history.

(56) References Cited

U.S. PATENT DOCUMENTS

| | | | | | |
|---|---|---|---|---|---|
| 1,754,736 | A | * | 4/1930 | Bryant | 81/441 |
| 1,844,241 | A | * | 2/1932 | Bryant | 81/441 |
| 2,121,197 | A | * | 6/1938 | Jackman | 81/441 |
| 2,839,953 | A | * | 6/1958 | Hanger | 408/72 R |
| 2,935,905 | A | * | 5/1960 | Winslow | 408/112 |
| 3,263,533 | A | * | 8/1966 | Carlson | 81/441 |
| 4,027,992 | A | * | 6/1977 | Mackey et al. | 408/97 |
| 4,078,458 | A | * | 3/1978 | Berendzen | 81/441 |
| 4,396,318 | A | * | 8/1983 | Jensen et al. | 408/95 |
| 5,281,056 | A | * | 1/1994 | Lawson et al. | 408/1 R |
| 5,395,187 | A | * | 3/1995 | Slesinski et al. | 408/1 R |
| 5,482,411 | A | * | 1/1996 | McGlasson | 408/1 R |
| 5,628,592 | A | * | 5/1997 | Ringer | 408/97 |
| 6,951,049 | B2 | * | 10/2005 | Klann | 29/267 |
| 6,971,824 | B2 | * | 12/2005 | Blankenship et al. | 408/97 |
| 7,901,165 | B2 | * | 3/2011 | Lipczynski et al. | 409/131 |
| 7,934,892 | B2 | * | 5/2011 | Fritsche et al. | 408/56 |
| 8,057,137 | B2 | * | 11/2011 | Lipczynski et al. | 409/200 |
| 8,225,508 | B2 | * | 7/2012 | Houis et al. | 29/897.2 |
| 2012/0087752 | A1 | * | 4/2012 | Herbold et al. | 408/1 R |
| 2012/0204398 | A1 | * | 8/2012 | Herbold et al. | 29/426.2 |
| 2012/0301291 | A1 | * | 11/2012 | Spanos et al. | 415/214.1 |

* cited by examiner

*Primary Examiner* — Lee D Wilson
*Assistant Examiner* — Jamal Daniel
(74) *Attorney, Agent, or Firm* — Sutherland Asbill & Brennan LLP

(57) ABSTRACT

The present application provides an extraction system for removing a retaining pin from a turbine engine. The extraction system may include a pin extraction fixture and a drill such that the pin extraction fixture positions the drill about the retaining pin. The pin extraction fixture may include a collet and one or more expanders positioned thereabout.

11 Claims, 4 Drawing Sheets

US 8,870,171 B2

SHROUD RETAINING PIN EXTRACTION SYSTEMS AND METHODS

TECHNICAL FIELD

The present application relates generally to gas turbine engines and more particularly relates to systems and methods for extracting broken shroud retaining pin plugs from a turbine casing in a fast, safe, and efficient manner.

BACKGROUND OF THE INVENTION

Gas turbine engines and other types of turbo-machinery require routine field maintenance and/or repair. Such maintenance or repair may require the disassembly of certain components of the gas turbine engine. For example, turbine shroud blocks may need to be removed in order to obtain access to the turbine buckets. These turbine shroud blocks generally are positioned just outboard of the turbine buckets and may be held in position by a number of retaining pins. The retaining pins typically are installed radially through threads in a turbine casing and into a receiving hole in the shroud block. The retaining pins generally include a plug at one end thereof. The retaining pins may be difficult to remove during maintenance. Specifically, the application of too much torque may shear off the plug in the turbine casing.

When retaining pin plugs are sheared off during field maintenance, the plugs generally are drilled out by hand using numerous drill bits, grinding burs, and the like. This hand drilling, however, sometimes causes damage to the turbine casing threads or elsewhere. Moreover, access to the broken plugs on, for example, the lower half of the turbine casing may be difficult to reach and requires precision work in often cramped quarters.

There is therefore a desire for improved systems and methods for removing broken shroud retaining pins and the like from a turbine casing. Such systems and methods should provide for quick removal of the broken shroud retaining pins while preventing damage to the turbine casing.

SUMMARY OF THE INVENTION

The present application thus provides an extraction system for removing a retaining pin from a turbine engine. The extraction system may include a pin extraction fixture and a drill such that the pin extraction fixture positions the drill about the retaining pin. The pin extraction fixture may include a collet and one or more expanders positioned thereabout.

The present application further provides for a method of extracting a retaining pin plug from a turbine casing of a turbine engine. The method may include the steps of positioning a pin extraction fixture within a counter-bore of the turbine casing, positioning a drill bushing within the pin extraction fixture, positioning a drill bit within the drill bushing, drilling the plug with the drill bit, removing the drill bit, the drill bushing, and the pin extraction fixture from the counter-bore of the turbine casing, inserting a screw extractor into the counter-bore of the turbine casing and the plug, and removing the plug from the counter-bore of the turbine casing with the screw extractor.

The present application further provides a pin extraction fixture. The pin extraction feature may include a collet, a lower collet expander, a torque wheel, and an upper collet expander.

These and other features and improvements of the present application will become apparent to one of ordinary skill in the art upon review of the following detailed description when taken in conjunction with the several drawings and the appended claims.

DETAILED DESCRIPTION

Figure 1:
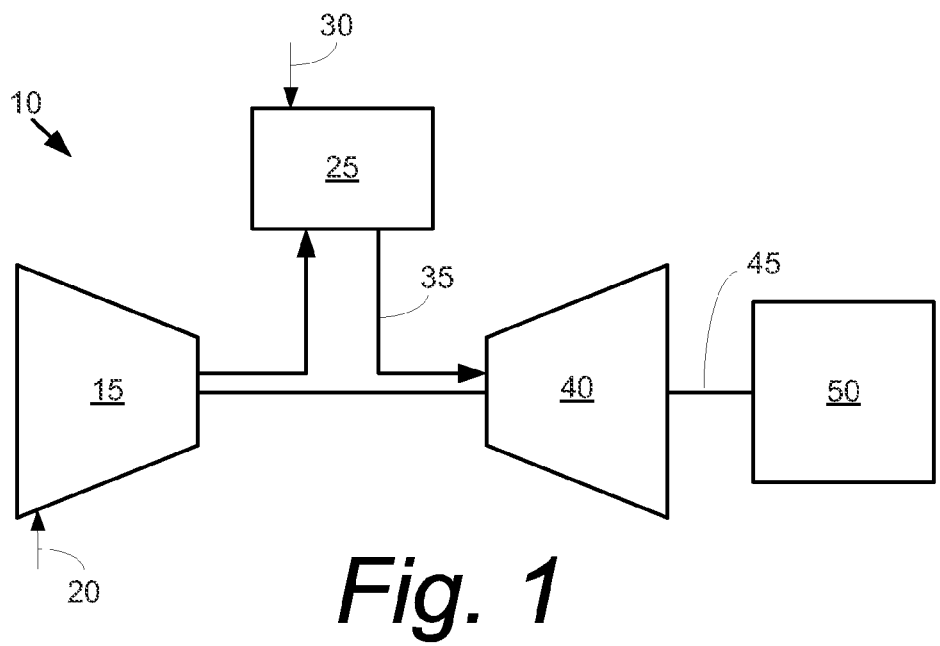
FIG. 1 is a schematic view of a gas turbine engine.

Referring now to the drawings, in which like numerals refer to like elements throughout the several views, FIG. 1 shows a schematic view of gas turbine engine 10 as may be described herein. The gas turbine engine 10 may include a compressor 15. The compressor 15 compresses an incoming flow of air 20. The compressor 10 delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. As described above, the mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y. and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
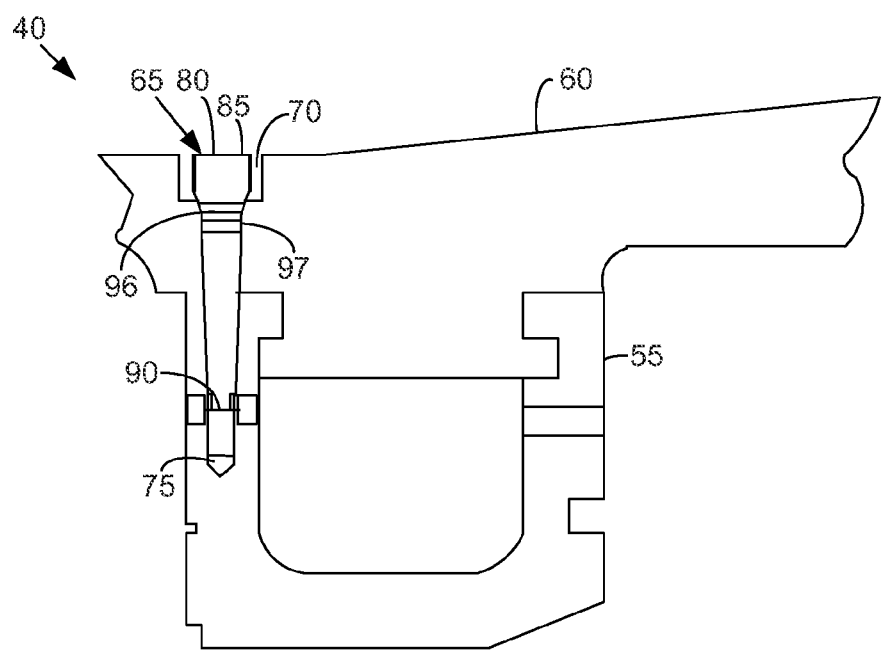
FIG. 2 is a side cross-sectional view of portions of a turbine showing the casing, a shroud block, and a one piece retaining pin.
Figure 3:
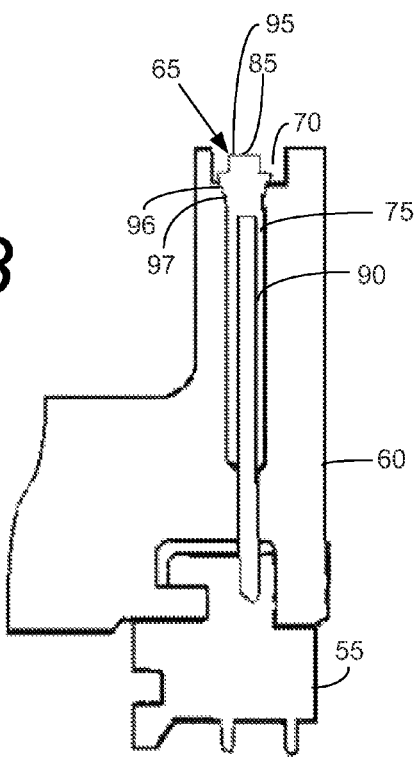
FIG. 3 is a side cross-sectional view of portions of a turbine showing the casing, a shroud block, and a two piece retaining pin.

FIG. 2 shows a portion of the turbine 40. Specifically, a shroud block 55 is attached to a turbine casing 60 via a retaining pin 65. The retaining pin 65 may extend through a counter-bore 70 within the turbine casing 60 and extend into a receiving hole 75 within the shroud block 55. In the example of FIG. 2, a one-piece retaining pin is used 80. The one-piece retaining pin 80 has integral plug 85 and pin portions 90. FIG. 3 shows a two-piece retaining pin 95 with separate plug 85 and pin portions 90. In either case, a number of plug threads 96 cooperate with a number of casing threads 97 to position the retaining pin 65 in place. As described above, the application of too much torque may cause the plug 85 to shear off.

Figure 4:
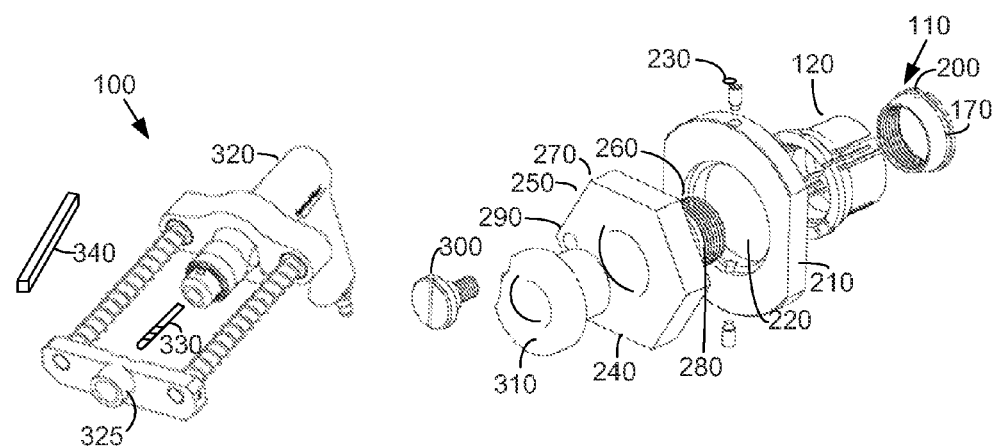
FIG. 4 is an exploded view of a pin extraction system as may be described herein.
Figure 5:
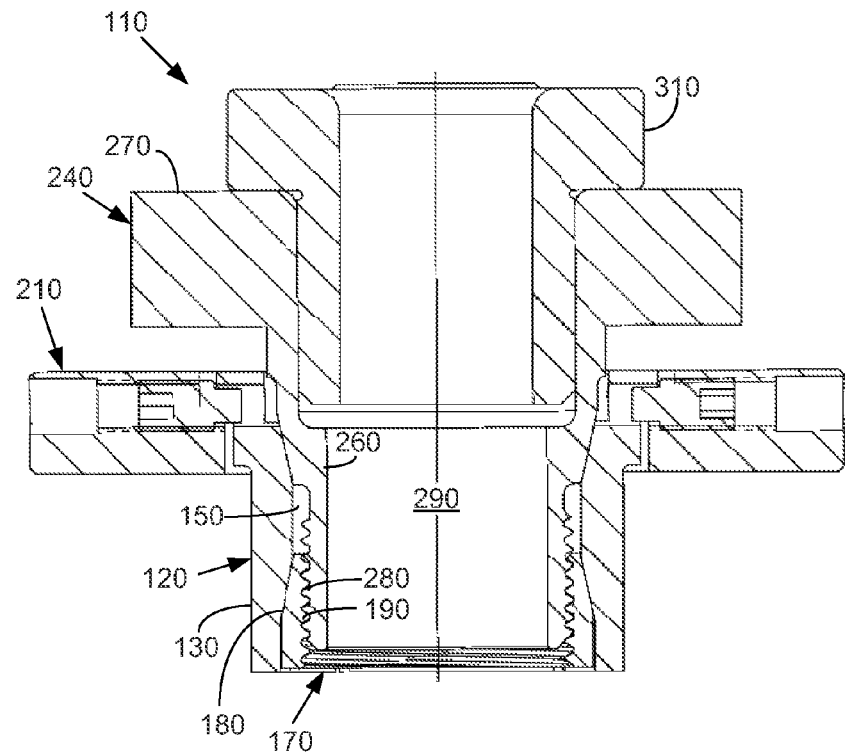
FIG. 5 is a side cross-sectional view of a pin extraction fixture of the pin extraction system of FIG. 4.
Figure 6:
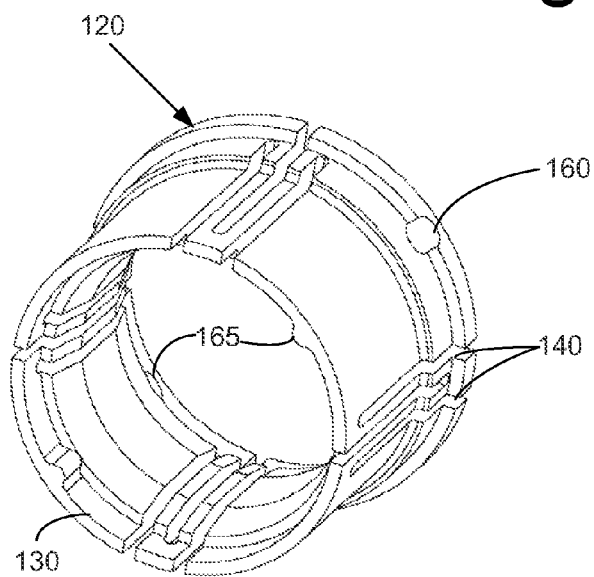
FIG. 6 is a perspective view of a collet of the pin extraction fixture of FIG. 5.
Figure 7:
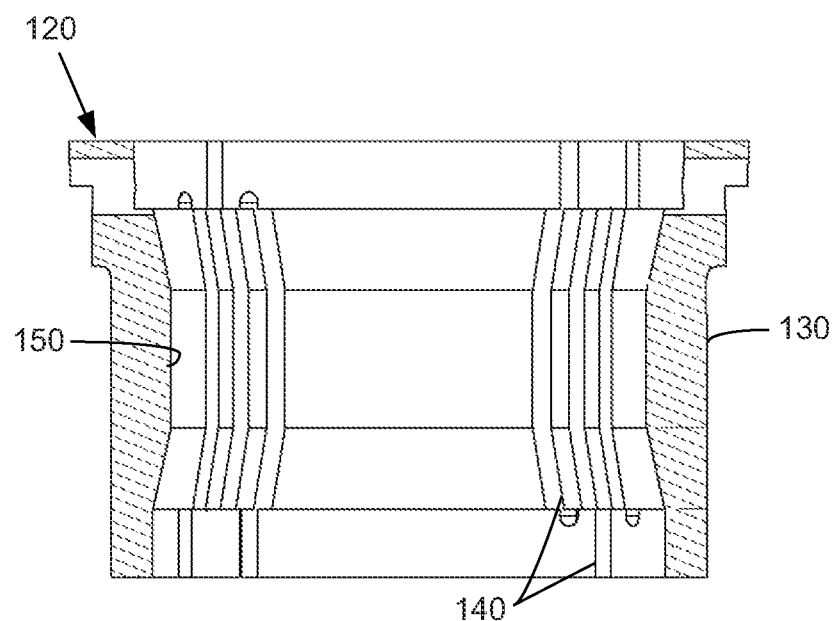
FIG. 7 is a side cross-sectional view of the collet of FIG. 6.

FIG. 4 shows a pin extraction system 100 as may be described herein. The pin extraction system 100 may include a pin extraction fixture 110 as is shown in FIGS. 4 and 5. The pin extraction fixture 110 may include a collet 120 as is also shown in FIGS. 5-7. As is known, a collet 110 is a type of chuck so as to provide a damping force on a work piece or a tool. The collet 120 may have a spring surface 130 with a number of kerfs 140 cut therein to allow for expansion and contraction. Likewise, the spring surface 130 may have an inner taper 150 with a largely hourglass-like shape. One end of collet 120 may have a collet alignment hole 160 therein. The other end of the collet 120 may have a number of internal bosses 165. Other configurations and other components may be used herein.

A lower collet expander 170 may be positioned within one end of the collet 120. (The terms "lower", "upper", and the like are meant to signify relative positions only. Either direction may be considered upper or lower.) The lower collet expander 170 may have a generally conical shape 180 so as to mate with the inner taper 150 of the collet 120. The lower collet expander 170 also may have a number of lower expander threads 190 on an interior thereof. The lower collet expander 170 also may have a lower expander alignment hole 200. The internal bosses 165 of the collet 120 may interface with the lower collet expander 170 to prevent rotation during tightening. A pin also may be used therein. Other configurations and other components may be used herein.

The other end of the collet 120 may be positioned within a torque wheel 210. The torque wheel 210 may have a largely flat donut like shape with an aperture 220 therein. The collet 120 may be positioned within the aperture 220 and locked into place via a number of set screws 230 or other types of attachment devices via the collet alignment holes 160. Other configurations and other components also may be used herein.

An upper collet expander 240 may be positioned within the collet 120 and the torque wheel 210. The upper collet expander 240 may have an upper expander plate 250 and an upper expander tube 260 attached thereto. The upper expander plate 250 may have a largely hexagon-like shape 270 and the like. The hexagon shape 270 allows the tightening of the upper collet expander 240 via a wrench and the like. The upper expander tube 260 includes a number of upper expander threads 280 thereon. The upper expander threads 280 mate with the lower expander threads 190 of the lower collet expander 170. The upper expander plate 250 may have a plate aperture 290 therein. A lock screw 300 may be positioned therein so as to position a drill bushing 310 within the upper collet expander 240. Other configurations and other components may be used herein.

As above, the drill bushing 310 may be positioned within the upper collet expander 240. The drill bushing 310 may be sized for the appropriate drill bit as will be described in more detail below. A number of drill bushings 310 may be used herein. Other configurations and other components may be used herein.

Referring again to FIG. 4, the pin extraction system 100 also may include a drill 320 for use with the pin extraction fixture 110. The drill 320 may be of conventional hand drill design and may be electric, pneumatic, and the like. The drill 320 may have a drill bit 330 therein. The drill 320 may use many different types and sizes of drill bits 330. Other configurations and other components may be used herein. The drill 320 also may be used with a locating cylinder 325. The drill 320 with the locating cylinder 325 may be used in lieu of the pin extraction fixture 110 when there may be insufficient counterbore depth.

In use the pin extraction system 100 may be used with many different types of gas turbine engines 10. As such, multiple pin extraction fixtures 110 and/or multiple components thereof may be used and sized for a particular type of turbine 40 and/or retaining pin 65. The pin extraction system 100 may be used with any threaded plug in an type of casing, i.e., a gas turbine, a stream turbine, a heavy duty compressor, or other types of industrial equipment.

In order to remove a broken retaining pin 65, the pin extraction fixture 110 may be positioned within the counter-bore 70 of the casing 60. The collet 120 may be expanded therein by tightening the upper expander plate 250 with respect to the torque wheel 210. The appropriately sized drill bushing 310 may be positioned therein. The drill bit 330 of the drill 320 then may be positioned within the drill bushing 310 so as to drill the plug 85 of the retaining pin 65. Differently sized drill bits 330 and/or different types of drills 320 may be used. Once the plug 85 has been drilled through, the pin extraction fixture 110 may be removed. A screw extractor 340 may be positioned within the drilled hole so as to remove the plug 85 if needed.

The pin extraction system 100 thus allows quick and efficient removal of retaining pins 65 from the casing 60. Moreover, the retaining pins 65 may be removed without causing damage to the turbine casing 60. The pin extraction system 100 thus reduces the time required for field maintenance and the like. The pin extraction system 100 and the pin extraction fixture 110 may be used to remove any type of embedded fixture within a bore.

The use of the drill 320 with the locating cylinder 325 allows the drill centerline to be placed on within a shallow counterbore or spotface that lacks ample depth for the pin extraction fixture 110. The locating cylinder 325 may be sized to fit within the spotface diameter with an end that is perpendicular to the rotation axis. The operator places the location cylinder 325 into the spotface and then overcomes the spring force to drill a hole through the sheared plug.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. An extraction system for removing a retaining pin from a turbine engine, comprising:
   a pin extraction fixture;
   the pin extraction fixture comprising a collet, an upper collet expander positioned at an end of the collet, and a lower collet expander positioned at an opposite end of the collet, the lower collet expander rotatably coupled to the upper collet expander; and
   a drill;
   wherein the pin extraction fixture positions the drill about the retaining pin.

2. The extraction system of claim 1, wherein the retaining pin configured to be removed by the extraction system comprises a plug positioned within a casing of the gas turbine engine; and
   the drill is positioned adjacent to the plug of the retaining pin.

3. The extraction system of claim 1, wherein the collet comprises a plurality of kerfs within a spring surface.

4. The extraction system of claim 1, wherein the collet comprises an inner taper.

5. The extraction system of claim 1, wherein the lower collet expander comprises a conical shape and a plurality of lower expander threads.

6. The extraction system of claim 1, further comprising a torque wheel positioned about the collet.

7. The extraction system of claim 1, wherein the upper collet expander comprises a hexagon-shaped plate.

8. The extraction system of claim 1, wherein the upper collet expander comprises a tube with a plurality of upper expander threads thereon.

9. The extraction system of claim 1, wherein the upper collet expander comprises a plate aperture with a lock screw therein.

10. The extraction system of claim 1, further comprising a drill busing positioned about the collet.

11. The extraction system of claim 1, further comprising a screw extractor.

* * * * *